United States Patent
Shen et al.

(10) Patent No.: US 9,761,881 B2
(45) Date of Patent: Sep. 12, 2017

(54) BINDER AND LITHIUM ION BATTERY USING THE SAME

(71) Applicants: Ningde Amperex Technology Limited, Ningde (CN); Dongguan Amperex Technology Limited, Dongguan (CN)

(72) Inventors: Hongguang Shen, Ningde (CN); Fuping Luo, Ningde (CN); Chao Gao, Ningde (CN); Qiang Zheng, Ningde (CN); Shengwei Wang, Ningde (CN)

(73) Assignees: Ningde Amperex Technology Limited, Ningde (CN); Dongguan Amperex Technology Limited, Dongguan (CN)

( * ) Notice: Subject to any disclaimer, the term of this patent is extended or adjusted under 35 U.S.C. 154(b) by 0 days.

(21) Appl. No.: 15/092,572

(22) Filed: Apr. 6, 2016

(65) Prior Publication Data

US 2016/0301076 A1 Oct. 13, 2016

(30) Foreign Application Priority Data

Apr. 7, 2015 (CN) .......................... 2015 1 0160413

(51) Int. Cl.
| | |
|---|---|
| *H01M 10/05* | (2010.01) |
| *H01M 4/62* | (2006.01) |
| *C08F 2/26* | (2006.01) |
| *H01M 10/0525* | (2010.01) |
| *C08F 222/16* | (2006.01) |

(52) U.S. Cl.
CPC .............. *H01M 4/622* (2013.01); *C08F 2/26* (2013.01); *H01M 10/0525* (2013.01); *C08F 2222/165* (2013.01); *H01M 2220/20* (2013.01); *Y02E 60/122* (2013.01)

(58) Field of Classification Search
CPC .............. H01M 4/622; H01M 10/0525; H01M 2220/20; C08F 2/26; C08F 2222/165
USPC .................................................... 526/318.44
See application file for complete search history.

(56) References Cited

U.S. PATENT DOCUMENTS

| | | | | |
|---|---|---|---|---|
| 9,413,011 B2 * | 8/2016 | Kang | .................... | H01M 4/622 |
| 2009/0280409 A1 | 11/2009 | Mogi | | |
| 2013/0216906 A1* | 8/2013 | Kang | .................... | H01M 4/622 429/211 |

FOREIGN PATENT DOCUMENTS

| | | | | |
|---|---|---|---|---|
| CN | 101463108 A | | 6/2009 | |
| CN | 102604568 A | | 7/2012 | |
| CN | 102959773 A | * | 3/2013 | ............ H01M 4/622 |
| CN | 102959773 A | | 3/2013 | |
| JP | 2013093297 A | * | 5/2013 | .............. H01M 4/62 |

OTHER PUBLICATIONS

Journal of Hunan University (Natural Science), Oct. 2008, 35(10): 55-59, and its English translation (OCR by Adobe Acrobat 9, Google Translate).
GB/T 21863-2008, "Gel permeation chromatography (GPC) Tetrahydrofuran as elution solvent," 2008, and its English translation (OCR by Adobe Acrobat 9, Google Translate).
GB/T 19466—Plastic: Differential Scanning Calorimetry (DSC), Parts 1-3, 2004, and its English translation (Gdogle Translate).
Office action from Chinese Patent Application No. 201510160413.0 dated Sep. 5, 2016 with English translation and partial translation of search report.
Hou et al. "Reactive Emulsifiers and Their Applications in Emulsion Polymerization" dated Apr. 2008, Modern Paint Finishing, vol. 11, No. 4, pp. 11-14, and machine translation (Adobe OCR and Google Translate).
Office action from Chinese Patent Application No. 201510160413.0 dated May 3, 2017 with machine English translation.
Zhu et al., "Reactive emulsifiers for emulsion polymerization" dated May 25, 2006, Chemical Industry and Engineering Progress, pp. 490-501, and its English translation (Adobe OCR and Google translate).

* cited by examiner

*Primary Examiner* — Michael M Bernshteyn
(74) *Attorney, Agent, or Firm* — Ladas & Parry, LLP

(57) ABSTRACT

The present application discloses a binder for a lithium ion battery, which comprises a polymer obtained through emulsion polymerization of a monomer in the presence of a reactive emulsifying agent. The binder is used in fabrication of a lithium ion electrode plate, whereby a thin film formed on the surface of an electrode membrane and fine channels formed in the electrode membrane with the use of a conventional emulsifying agent during the electrode membrane-forming process are eliminated, and the lithium ion conductivity of the electrode membrane is improved. Meanwhile, with the use of the reactive emulsifying agent, the bonding effect of the binder and the stability of the electrode membrane are improved, thereby greatly improving the charging rate and cycle life of the lithium ion battery.

9 Claims, No Drawings

BINDER AND LITHIUM ION BATTERY USING THE SAME

CROSS-REFERENCE TO RELATED APPLICATIONS

This application claims priority to and the benefit of Chinese Patent Application 201510160413.0 filed on Apr. 7, 2015, the disclosure of which is incorporated herein in its entirety by reference.

TECHNICAL FIELD

This application relates to a binder, and an electrode plate and a lithium ion battery using the same, which fall within the technical field of lithium ion batteries.

BACKGROUND

Lithium ion batteries are widely used in various portable electronics, and also serve as a power source in the area of continuously increased electric vehicles, due to the advantages such as high energy density, long cycle life, low environmental pollution and others.

A binder used in fabrication of an electrode plate of a lithium ion battery is obtained generally through emulsion polymerization. During the emulsion polymerization process, a certain amount of an emulsifying agent needs to be added, to realize stabilization and nucleation of the system. At present, the commonly used emulsifying agent is present in the binder by physical adsorption on the surface of the polymer. If such a binder is used in the fabrication of an electrode plate, molecular migration of the emulsifying agent occurs during the membrane forming process of an electrode membrane, such that a thin film of the emulsifying agent is formed on the surface of the electrode membrane. Moreover, fine channels are formed during the molecular migration of the emulsifying agent, which impacts the lithium ion conductivity, the mechanical properties, the electrical performance, the optical performance, the water resistance and so on of the electrode membrane.

SUMMARY OF THE INVENTION

According to an aspect of this application, a binder for a lithium ion battery is provided. The binder is used in fabrication of an electrode plate of a lithium ion battery, whereby a thin film formed on the surface of an electrode membrane and fine channels formed in the electrode membrane with the use of a conventional emulsifying agent during the electrode membrane-forming process are eliminated, and the lithium ion conductivity of the electrode membrane is improved. Meanwhile, with the use of the reactive emulsifying agent, the bonding effect of the binder and the stability of the electrode membrane are improved, thereby greatly improving the charging rate and cycle life of the lithium ion battery.

The binder for a lithium ion battery comprises a polymer obtained through emulsion polymerization of a monomer in the presence of a reactive emulsifying agent.

The reactive emulsifying agent contains a carbon-carbon double bond C=C.

The monomer comprises at least one compound having a chemical structure of Formula I:

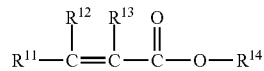
Formula I

Wherein, is hydrogen or is selected from an alkyl group having 1 to 20 carbon atoms; $R^{11}$ is hydrogen or $R^{11}$ is selected from an alkyl group having 1 to 20 carbon atoms; $R^{12}$ is hydrogen or $R^{12}$ is selected from an alkyl group having 1 to 20 carbon atoms; and $R^{14}$ is hydrogen or $R^{14}$ is selected from an alkyl group having 1 to 20 carbon atoms.

Preferably, the reactive emulsifying agent is selected from a compound with a chemical structure comprising at least one of a moiety of Formula II, a moiety of Formula III, and a moiety of Formula IV:

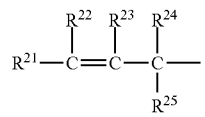
Formula II wherein $R^{21}$ is hydrogen or $R^{21}$ is selected from an alkyl group having 1 to 20 carbon atoms; $R^{22}$ is hydrogen or $R^{22}$ is selected from an alkyl group having 1 to 20 carbon atoms; $R^{23}$ is hydrogen or $R^{23}$ is selected from an alkyl group having 1 to 20 carbon atoms; $R^{24}$ is hydrogen or $R^{24}$ is selected from an alkyl group having 1 to 20 carbon atoms; and $R^{25}$ is hydrogen or $R^{25}$ is selected from an alkyl group having 1 to 20 carbon atoms;

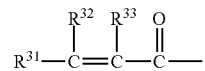
Formula III where $R^{31}$ is hydrogen or $R^{31}$ is selected from an alkyl group having 1 to 20 carbon atoms; $R^{32}$ is hydrogen or $R^{32}$ is selected from an alkyl group having 1 to 20 carbon atoms; and $R^{33}$ is hydrogen or $R^{33}$ is selected from an alkyl group having 1 to 20 carbon atoms; and

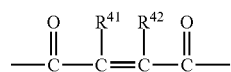
Formula IV where $R^{41}$ is hydrogen or $R^{41}$ is selected from an alkyl group having 1 to 20 carbon atoms; and $R^{42}$ is hydrogen or $R^{42}$ is selected from an alkyl group having 1 to 20 carbon atoms.

Preferably, $R^{21}$, $R^{22}$, $R^{23}$, $R^{24}$ and $R^{25}$ in Formula II, $R^{31}$, $R^{32}$ and $R^{33}$ in Formula III, and $R^{41}$ and $R^{42}$ in Formula IV are all hydrogen.

Preferably, the reactive emulsifying agent is selected from at least one of an allyl hydroxyalkyl sulfonate, an allyloxy alkylphenoxy polyoxyethylene ether sulfate, an allyloxysulfonate, an acrylamido sulfonate, a maleate and a derivative thereof, and an alkyl allylsuccinate sulfonate.

The allyl hydroxyalkyl sulfonate is selected from at least one of a compound with a chemical structure of Formula V:

Formula V

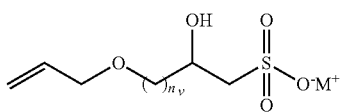

where $n_v$ is selected from any positive integer ranging from 1 to 10; and $M^+$ is selected from at least one of $Li^+$, $Na^+$, $K^+$, $Rb^+$, $Cs^+$, and $NH_4^+$. Further preferably, $n_v$ is selected from 1, 2 or 3; and $M^+$ is $Na^+$ and/or $NH_4^+$.

The allyloxy alkylphenoxy polyoxyethylene ether sulfate is selected from at least one of a compound with a chemical structure of Formula VI:

Formula VI

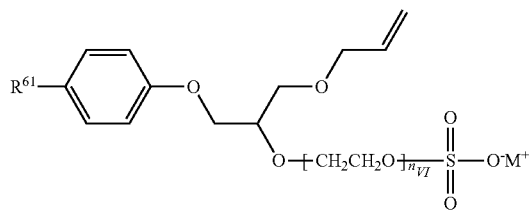

where $n_{vI}$ is selected from any positive integer ranging from 10 to 20; $R^{61}$ is selected from an alkyl group having 1 to 20 carbon atoms; $M^+$ is selected from at least one of $Li^+$, $Na^+$, $K^+$, $Rb^+$, $Cs^+$, and $NH_4^+$. Further preferably, $n_{vI}$ is selected from 10, 15 or 20; and $M^+$ is $Na^+$ and/or $NH_4^+$.

The allyloxysulfonate is selected from at least one of a compound with a chemical structure of Formula VII:

Formula VII

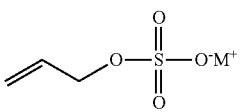

where $M^+$ is selected from at least one of $Li^+$, $Na^+$, $K^+$, $Rb^+$, $Cs^+$, and $NH_4^+$. Further preferably, $M^+$ is $Na^+$ and/or $NH_4^+$.

The acrylamido sulfonate is selected from at least one of a compound with a chemical structure of Formula VIII:

Formula VIII

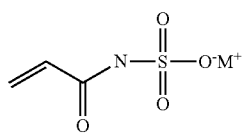

where $M^+$ is selected from at least one of $Li^+$, $Na^+$, $K^+$, $Rb^+$, $Cs^+$, and $NH_4^+$. Further preferably, $M^+$ is $Na^+$ and/or $NH_4^+$.

The maleate and the derivative thereof are selected from at least one of a compound with a chemical structure of Formula IX:

Formula IX

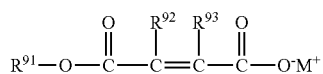

where $R^{91}$ is hydrogen or $R^{91}$ is selected from an alkyl group having 1 to 20 carbon atoms; $R^{92}$ is hydrogen or $R^{92}$ is selected from an alkyl group having 1 to 10 carbon atoms; $R^{93}$ is hydrogen or $R^{93}$ is selected from an alkyl group having 1 to 10 carbon atoms; and $M^+$ is selected from at least one of $Li^+$, $Na^+$, $K^+$, $Rb^+$, $Cs^+$, and $NH_4^+$. Further preferably, $M^+$ is $Na^+$ and/or $NH_4^+$. Further preferably, the maleate and the derivative thereof are sodium dodecyl maleate.

The alkyl allylsuccinate sulfonate is selected from at least one of a compound with a chemical structure of Formula X:

Formula X

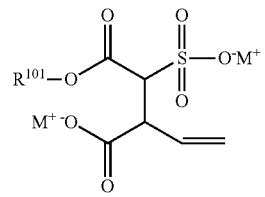

where $R^{101}$ is selected from an alkyl group having 1 to 20 carbon atoms; and $M^+$ is selected from at least one of $Li^+$, $Na^+$, $K^+$, $Rb^+$, $Cs^+$, and $NH_4^+$. Further preferably, $M^+$ is $Na^+$ and/or $NH_4^+$.

Preferably, the weight ratio of the reactive emulsifying agent to the monomer is 1-3:100.

Preferably, $R^{11}$ and $R^{12}$ in Formula I are hydrogen. That is, the monomer contains at least one of an acrylic acid monomer, and an acrylate monomer.

Further preferably, the monomer comprises a hard monomer, a soft monomer, and a functional monomer.

The hard monomer is selected from at least one of methyl acrylate, t-butyl acrylate, cyclohexyl acrylate, methyl methacrylate, ethyl methacrylate, n-butyl methacrylate, and isobornyl methacrylate.

The soft monomer is selected from at least one of ethyl acrylate, n-butyl acrylate, isobutyl acrylate, s-butyl acrylate, n-propyl acrylate, lauryl acrylate, 2-ethylhexyl acrylate, 2-ethylhexyl methacrylate, and lauryl methacrylate.

The functional monomer is selected from at least one of acrylic acid, methacrylic acid, methylenesuccinic acid, trifluorochloroethylene, vinylidene fluoride, tetrafluoroethylene, a fluoroacrylic acid monomer, 2-hydroxyethyl acrylate, 2-hydroxypropyl acrylate, 2-hydroxyethyl methacrylate, 2-hydroxypropyl methacrylate, trifluoroethyl methacrylate, glycidyl methacrylate, N-hydroxymethyl acrylamide, N-butoxymethyl acrylamide, divinyl benzene, vinyl trimethoxy silicane, and methacryloxy propyl trimethoxy silane.

The monomer may further comprise a non-acrylic monomer. The non-acrylic monomer is selected from at least one of styrene, acrylonitrile, vinyl acetate, chloroethylene, divinyl benzene, ethylene diacrylate, butylene diacrylate, and acrylamide.

Preferably, the polymer has a glass transition temperature of 0-50° C.

Preferably, the polymer has a weight average molecular weight of 300-1,500 kDa.

Preferably, the binder has a solid content of 25-51 wt %.

The binder for a lithium ion battery is prepared through an emulsion polymerization process, comprising at least the following steps of:
(a) dissolving 1-3 parts by weight of a reactive emulsifying agent in 100-300 parts by weight of water, to obtain a solution containing the reactive emulsifying agent;

(b) dissolving 0.3-3 parts by weight of an initiator in 30-100 parts by weight of water, to obtain a solution containing the initiator; and (c) adding 33 parts by weight of a monomer to the solution containing the reactive emulsifying agent obtained in Step a), mixing and emulsifying, then adding ⅓ by weight of the solution containing the initiator, adding 67 parts by weight of the monomer and the remaining ⅔ by weight of the solution containing the initiator dropwise to the system after polymerization, then reacting the system at 50-80° C. for no more than 5 hrs after the addition is complete, and cooling, to obtain the binder.

According to another aspect of this application, an electrode plate is provided, which contains at least one of any of the binders above. The electrode plate includes a current collector and an electrode membrane coated thereon.

The electrode membrane is obtained by coating a slurry containing an electrode active material, a conductive agent and the binder onto the current collector.

The binder may be used in a positive electrode plate and also a negative electrode plate. When the electrode active material is a positive electrode active material, the electrode plate is a positive electrode plate. When the electrode active material is a negative electrode active material, the electrode plate is a negative electrode plate.

The positive electrode active material is optionally selected from at least one of lithium cobaltate ($LiCoO_2$), lithium nickel cobalt manganese oxide ($LiNi_{1/3}Co_{1/3}Mn_{1/3}O_2$), lithium manganese oxide ($LiMnO_2$), and lithium iron phosphate ($LiFePO_4$).

The negative electrode active material is selected from at least one of natural graphite, artificial graphite, soft carbon, hard carbon, lithium titanate, and silicon.

Preferably, the binder is present in the electrode membrane in an amount of 0.5-2% by weight. Further preferably, the binder is present in the electrode membrane in an amount of 1-2% by weight.

According to a further aspect of this application, a lithium ion battery is provided, which contains at least one of any of the binders above. The lithium ion battery includes a positive electrode plate, a negative electrode plate, a separator, and an electrolyte solution.

The positive electrode plate and/or the negative electrode plate contain any of the binders above.

In this application, the term, "reactive emulsifying agent" is also referred to as a polymerizable emulsifying agent, which is an emulsifying agent having hydrophilic and lipophilic groups for emulsification and also groups reactive in polymerization in its molecular structure. In the reactive emulsifying agent described in this application, the functional group reactive in polymerization is carbon-carbon double bond C=C.

The alkyl group is a group derived from any linear alkane, any branched alkane, or any cycloalkane having one hydrogen atom los.

The present application has the beneficial effect including at least the following.

(1) By using the binder provided in this application, a thin film formed on the surface of and fine channels formed in an electrode membrane with the use of a conventional emulsifying agent during the electrode membrane-forming process are eliminated, and the lithium ion conductivity of the electrode membrane is improved.

(2) With the use of the binder provided in this application, the bonding effect of the binder and the stability of the electrode membrane are improved, thereby greatly improving the charging rate and cycle life of the lithium ion battery.

(3) The lithium ion battery provided in this application has the advantages of rapid charging rate and long cycle life.

DETAILED DESCRIPTION OF THE INVENTION

Hereinafter, this application is described in detail below with reference to examples, but the application is not limited thereto.

In the examples, the reactive emulsifying agent sodium dodecyl maleate is synthesized following the process described in the literature [Journal of Hunan University (Natural Science), 2008, 35(10): 55-59], the thickener, sodium carboxymethyl cellulose (CMC), is one having a weight average molecular weight of 200-300 kDa; the conductive carbon black Super-P is one having a specific surface area of 60-70 m$^2$/g and a density of 160±10 Kg/m$^3$. The binder, polyvinylidene fluoride (PVDF), is one having a weight average molecular weight of 600-700 kDa; and the binder, styrene-butadiene rubber (SBR), is one having a weight average molecular weight of 70-80 kDa.

In the comparative examples, octyl phenol polyoxyethylene ether has a molecular weight of 646.34, a pH (1% aqueous solution) of 8.0-9.0, and a clouding point (1% aqueous solution) of greater than 0° C.

Example 1. Preparation of Binder Samples B1-B17

Preparation of Binder Sample B1:

3 parts by weight of sodium dodecyl maleate was used as an emulsifying agent. A mixture of 48.5 parts by weight of methyl methacrylate, 48.5 parts by weight of n-butyl acrylate and 3 parts by weight of acrylic acid was used as monomers. Ammonium persulfate was used as a polymerization initiator, and an aqueous initiator solution was obtained by dissolving 2 parts by weight of ammonium persulfate in 50 parts by weight of deionized water.

3 parts by weight of sodium dodecyl maleate and 150 parts by weight of deionized water were added to a four-neck reactor, and heated to 60° C. with stirring, to obtain an aqueous emulsifying agent solution after sodium dodecyl maleate was completely dissolved. ⅓ of the monomers was added to the four-neck reactor, mixed with and emulsified by the aqueous emulsifying agent solution by stirring, and then heated to 75° C. ⅓ of the aqueous initiator solution was added to the four-neck reactor, to initiate the polymerization. The remaining ⅔ of the monomers and the remaining ⅔ of the aqueous initiator solution were evenly added dropwise after the system became blue and no obvious reflux was produced. The addition of the monomers was completed in 2 hrs, followed by the aqueous initiator solution at a later time. After addition, the system was maintained at 75° C. for 2 hrs, and then cooled to obtain a binder designated as sample B1.

Preparation of Binder Samples B2-B17:

The specific steps were as described in the preparation of B1, except that the species and amounts of the emulsifying agent, the monomers, and the initiator, and the polymerization temperature and time were changed. The resulting samples were designated as B2-B17 respectively.

The binder numbers and respective species and amounts of the emulsifying agent, the monomers, and the initiator, and the polymerization temperature and time are shown in Table 1.

TABLE 1

| Binder No. | Aqueous emulsifying agent solution - Species and amount (parts by weight) of emulsifying agent | Amount of water (parts by weight) | Species and amount (parts by weight) of monomers | Aqueous initiator solution - Species and amount (parts by weight) of initiator | Amount of water (parts by weight) | Polymerization Temperature Time |
|---|---|---|---|---|---|---|
| B1 | Sodium dodecyl maleate 3 | 150 | Methyl methacrylate 48.5 n-butyl acrylate 48.5 Acrylic acid 3 | Ammonium persulfate 2 | 50 | 75° C. 2 h |
| B2 | Sodium dodecyl maleate 2 | 150 | Methyl methacrylate 48.5 n-butyl acrylate 48.5 Acrylic acid 3 | Ammonium persulfate 2 | 50 | 75° C. 2 h |
| B3 | Sodium dodecyl maleate 1 | 150 | Methyl methacrylate 48.5 n-butyl acrylate 48.5 Acrylic acid 3 | Ammonium persulfate 2 | 50 | 75° C. 2 h |
| B4 | Sodium dodecyl maleate 3 | 150 | Methyl methacrylate 48.5 n-butyl acrylate 48.5 Acrylic acid 3 | Ammonium persulfate 0.3 | 50 | 80° C. 2 h |
| B5 | Sodium dodecyl maleate 3 | 150 | Methyl methacrylate 48.5 n-butyl acrylate 48.5 Acrylic acid 3 | Ammonium persulfate 1 | 50 | 80° C. 2 h |
| B6 | Sodium dodecyl maleate 3 | 150 | Methyl methacrylate 48.5 n-butyl acrylate 48.5 Acrylic acid 3 | Ammonium persulfate 3 | 50 | 80° C. 2 h |
| B7 | Sodium dodecyl maleate 3 | 150 | Methyl methacrylate 48.5 n-butyl acrylate 48.5 Acrylic acid 3 | Ammonium persulfate 2 | 150 | 75° C. 2 h |
| B8 | Sodium dodecyl maleate 3 | 70 | Methyl methacrylate 48.5 n-butyl acrylate 48.5 Acrylic acid 3 | Ammonium persulfate 2 | 30 | 75° C. 2 h |
| B9 | Sodium dodecyl maleate 3 | 150 | Styrene 19.6 Methyl acrylate 27 Ethyl acrylate 50.4 Acrylic acid 3 | Ammonium persulfate 2 | 50 | 70° C. 3 h |
| B10 | Sodium dodecyl maleate 3 | 150 | Styrene 28.9 Methyl acrylate 27 Ethyl acrylate 41.1 Acrylic acid 3 | Ammonium persulfate 2 | 50 | 65° C. 4 h |
| B11 | Sodium dodecyl maleate 3 | 150 | Styrene 37.6 Methyl acrylate 27 Ethyl acrylate 32.4 Acrylic acid 3 | Ammonium persulfate 2 | 50 | 50° C. 5 h |
| B12 | Sodium dodecyl maleate 3 | 150 | Styrene 45.8 Methyl acrylate 27 Ethyl acrylate 24.2 Acrylic acid 3 | Ammonium persulfate 2 | 50 | 75° C. 2 h |
| B13 | Sodium allyl hydroxyalkyl sulfonate 3 | 150 | Methyl methacrylate 48.5 n-butyl acrylate 48.5 Acrylic acid 3 | Ammonium persulfate 2 | 50 | 75° C. 2 h |

TABLE 1-continued

| Binder No. | Aqueous emulsifying agent solution | | Aqueous initiator solution | | Polymerization Temperature Time |
| | Species and amount (parts by weight) of emulsifying agent | Amount of water (parts by weight) | Species and amount (parts by weight) of monomers | Species and amount (parts by weight) of initiator | Amount of water (parts by weight) | |
|---|---|---|---|---|---|---|
| B14 | Ammonium allyloxy nonylphenol polyoxyethylene ether sulfate 3 | 150 | Methyl methacrylate 48.5 n-butyl acrylate 48.5 Acrylic acid 3 | Ammonium persulfate 2 | 50 | 75° C. 2 h |
| B15 | Sodium allyl ether sulfonate 3 | 150 | Methyl methacrylate 48.5 n-butyl acrylate 48.5 Acrylic acid 3 | Ammonium persulfate 2 | 50 | 75° C. 2 h |
| B16 | Sodium acrylamido sulfonate 3 | 150 | Methyl methacrylate 48.5 n-butyl acrylate 48.5 Acrylic acid 3 | Ammonium persulfate 2 | 50 | 75° C. 2 h |
| B17 | Sodium alkyl allylsuccinate sulfonate 3 | 150 | Methyl methacrylate 48.5 n-butyl acrylate 48.5 Acrylic acid 3 | Ammonium persulfate 2 | 50 | 75° C. 2 h |

Comparative Example 1

Preparation of Binder DB1

The specific steps were the same as described in the preparation of B1, except that the emulsifying agent was 2.3 parts by weight of sodium dodecyl sulfate and 0.8 part by weight of octyl phenol polyoxyethylene ether. The resulting binder was designated as DB1.

Example 2. Determination of Molecular Weight and Glass Transition Temperature of Polymer in the Binder The weight average molecular weight of the polymer in the binders B1-B17 obtained in Example 1 and the binder DB1 obtained in Comparative Example 1 was determined/calculated by gel permeation chromatography. See GB/T 21863-2008 for specific steps/process.

The glass transition temperature of the polymer in the binders B1-B17 obtained in Example 1 and the binder DB1 obtained in Comparative Example 1 was determined/calculated by differential scanning calorimetry. See GB/T 19466—Plastic: Differential Scanning Calorimetry (DSC) for specific steps/process.

The results are shown in Table 2.

TABLE 2

| Binder No. | Weight average molecular weight (×10 kDa) | Glass transition temperature (° C.) |
|---|---|---|
| B1 | 78 | 5 |
| B2 | 80 | 5 |
| B3 | 81 | 5 |
| B4 | 93 | 8 |
| B5 | 87 | 6 |
| B6 | 63 | 4 |
| B7 | 77 | 5 |
| B8 | 79 | 5 |
| B9 | 81 | 5 |
| B10 | 80 | 15 |
| B11 | 77 | 25 |
| B12 | 79 | 35 |
| B13 | 81 | 5 |
| B14 | 83 | 5 |
| B15 | 78 | 5 |
| B16 | 82 | 5 |
| B17 | 83 | 5 |
| DB1 | 79 | 4 |

Example 3. Fabrication of Electrode Plate and Lithium Ion Battery

Fabrication of a Positive Electrode Plate:

Lithium cobaltate (molecular formula $LiCoO_2$) as the positive electrode active material, the conductive carbon black Super-P as the conductive agent, and the binder were uniformly dispersed in the solvent N-methyl pyrrolidone (NMP), to prepare a positive electrode slurry. The positive electrode slurry had a solid content of 75 wt %, and the solid ingredients consisted of 97 wt % of lithium cobaltate, 1.6 wt % of the binder polymer and 1.4 wt % of the conductive carbon black Super-P. The positive electrode slurry was evenly coated in an amount of 0.018 g/cm$^2$ onto an aluminium foil with a thickness of 12 μm and used as a positive electrode current collector. The aluminium foil was then oven dried at 85° C., cold pressed, trimmed, cut into pieces, slit into stripes, dried at 85° C. for 4 hrs under vacuum, and then subjected to tab welding, to obtain a positive electrode plate.

Fabrication of a Negative Electrode Plate

Artificial graphite as the negative electrode active material, the conductive carbon black Super-P as the conductive agent, and the binder were uniformly mixed in deionized water, to prepare a negative electrode slurry. The negative electrode slurry had a solid content of 50 wt %, and the solid ingredients consisted of 96.5 wt % of artificial graphite, 1.0 wt % of the conductive carbon black Super-P, and 2.5 wt % of the binder polymer. The negative electrode slurry was evenly coated in an amount of 0.0089 g/cm² onto a copper foil with a thickness of 8 μm and used as a negative electrode current collector. The aluminium foil was then oven dried at 85° C., cold pressed, trimmed, cut into pieces, slit into stripes, dried at 110° C. for 4 hrs under vacuum, and then subjected to tab welding, to obtain a negative electrode plate.

Preparation of Electrolyte Solution

In a dry chamber, ethylene acetate (EC), propylene carbonate (PC) and diethyl carbonate (DEC) were uniformly mixed at a weight ratio of EC:PC:DEC=30:30:40, to obtain a non-aqueous organic solvent. $LiPF_6$ was added to the non-aqueous organic solvent, to obtain a 1 mol/L solution of $LiPF_6$, which was precisely the electrolyte solution.

Fabrication of Lithium Ion Battery:

A polyethylene film with a thickness of 12 μm was used as a separator.

The steps were specifically as follows.

The positive electrode plate, the separator and the negative electrode plate were superimposed in sequence such that the separator is switched between the positive electrode plate and the negative electrode plate for separation. The system was then rolled into a square bare battery core having a thickness of 8 mm, a width of 60 mm, and a length of 130 mm. The bare battery core was packaged in an aluminium foil bag, oven dried at 75° C. under vacuum for 10 hrs. A non-aqueous electrolyte solution L1# was injected, vacuum encapsulated, and stood for 24 hrs. The battery was charged to 4.35 V at a constant current of 0.1 C (160 mA), then charged at a constant voltage of 4.35 V until the current dropped to 0.05 C (80 mA), and then discharged to 3.0 V at a constant current of 0.1 C (160 mA). The charge and discharge process was repeated 2 times. Finally, the battery was charged to 3.85 V at a constant current of 0.1 C (160 mA), to finish the fabrication of the lithium ion secondary battery.

The battery numbers and the binder used in respective electrode plates are shown in Table 3.

TABLE 3

| Battery No. | Binder in positive electrode plate | Binder in negative electrode plate |
| --- | --- | --- |
| C1 | B1 | B1 |
| C2 | B2 | B2 |
| C3 | B3 | B3 |
| C4 | B4 | B4 |
| C5 | B5 | B5 |
| C6 | B6 | B6 |
| C7 | B7 | B7 |
| C8 | B8 | B8 |
| C9 | B9 | B9 |
| C10 | B10 | B10 |
| C11 | B11 | B11 |
| C12 | B12 | B12 |
| C13 | B13 | B13 |
| C14 | B14 | B14 |
| C15 | B15 | B15 |
| C16 | B16 | B16 |
| C17 | B17 | B17 |
| C18 | B1 | Styrene-butadiene rubber (SBR, present in the binder in an amount of 50% by weight) binder |
| C19 | polyvinylidene fluoride (PVDF, present in the binder in an amount of 10% by weight) binder | B1 |
| DC1 | DB1 | DB1 |

Example 4. Test of Charging Characteristics of Lithium Ion Secondary Batteries

The charging characteristics of lithium ion secondary batteries C1-C19 and DC1 fabricated in Example 3 were tested respectively.

The process was specifically as follows.

The lithium ion secondary batteries were charged to 4.35 V at a constant current of 6 C at 25° C., and then charged at a constant voltage of 4.35 V till the current was 0.05 C. The sampling time interval was 5 s. The time to 50%, 80%, and 100% SOC were derived from raw data.

TABLE 4

| Battery No. | Time to 50% SOC at 6 C (min) | Time to 80% SOC at 6 C (min) | Time to 100% SOC at 6 C (min) |
| --- | --- | --- | --- |
| C1 | 7 | 18.5 | 49.8 |
| C2 | 6.8 | 18 | 49 |
| C3 | 7 | 18 | 49 |
| C4 | 5 | 15 | 45 |
| C5 | 6 | 16 | 47 |
| C6 | 8 | 20 | 56 |
| C7 | 6.7 | 18.3 | 49.4 |
| C8 | 7 | 18.1 | 49.6 |
| C9 | 7.1 | 18 | 49 |
| C10 | 7.2 | 18 | 49.1 |
| C11 | 6.9 | 18.1 | 48.9 |
| C12 | 7.2 | 18 | 48.8 |
| C13 | 7 | 18.3 | 49 |
| C14 | 7.1 | 18 | 49.2 |
| C15 | 6.9 | 17.8 | 48.8 |
| C16 | 7 | 17.9 | 48.9 |
| C17 | 6.7 | 17.7 | 49 |

TABLE 4-continued

| Battery No. | Time to 50% SOC at 6 C (min) | Time to 80% SOC at 6 C (min) | Time to 100% SOC at 6 C (min) |
|---|---|---|---|
| C18 | 9 | 23 | 58.5 |
| C19 | 8.5 | 21 | 57 |
| DC1 | 10 | 25 | 61 |

Example 5. Test of Cycle Performance of Lithium Ion Secondary Batteries

The cycle performance of lithium ion secondary batteries C1-C19 and DC1 fabricated in Example 3 were tested respectively.

The process was specifically as follows. The lithium ion secondary batteries were charged to 4.35 V at a constant current of 6 C at 25° C., then charged at a constant voltage of 4.35 V till the current was 0.05 C, and then discharged to 3.0 V at a constant current of 1 C. This was one round of charge-discharge cycle. The discharge capacity is that of the first cycle. After being stood for half an hour, the charge-discharge cycling test of the lithium ion secondary batteries was conducted following the process above.

The discharge capacity at the cycles 100, 200, 300, 400 and 500 was recorded and the capacity retention rate was calculated.

Capacity retention rate of lithium ion secondary battery after $N$ rounds of cycles (%)=[Discharge capacity of the $N$th cycle/Discharge capacity of the $1^{st}$ cycle]×100%.

The lithium ion batteries after 500 rounds of cycles were disassembled, the thickness of the anode plates as measured to calculate the increase rate in the thickness.

Increase rate in thickness of anode plate (%)= (Thickness after 500 rounds of cycles−initial thickness)/initial thickness×100%

The test results are shown in Table 5.

TABLE 5

| Battery No. | Capacity retention rate after N rounds of cycles (%) | | | | | Increase rate in thickness after 500 rounds of cycles (%) |
|---|---|---|---|---|---|---|
|  | 100 | 200 | 300 | 400 | 500 |  |
| C1 | 96.2 | 93.9 | 93 | 92.1 | 90.8 | 15.4 |
| C2 | 96 | 94.1 | 92.9 | 92 | 91 | 15.5 |
| C3 | 96 | 94 | 93 | 92 | 91 | 15.3 |
| C4 | 96 | 93.8 | 93.1 | 92.2 | 91 | 15.7 |
| C5 | 96 | 94 | 93 | 92 | 91 | 15.4 |
| C6 | 96 | 94 | 93 | 92 | 91 | 15.4 |
| C7 | 95.8 | 94 | 93 | 92 | 91 | 15.5 |
| C8 | 96.3 | 94 | 93 | 92 | 91 | 15.4 |
| C9 | 96 | 94 | 93 | 92 | 91 | 15.5 |
| C10 | 95.5 | 93.6 | 92.7 | 91.6 | 90.8 | 15.9 |
| C11 | 94.9 | 93.7 | 91.9 | 91 | 89.4 | 16.5 |
| C12 | 94 | 93 | 91 | 90 | 89 | 16.8 |
| C13 | 95.7 | 93.9 | 92.7 | 91.7 | 90.8 | 15.3 |
| C14 | 96 | 94 | 93 | 92 | 91 | 15.5 |
| C15 | 96 | 93.6 | 92.5 | 91.9 | 90.7 | 15.4 |
| C16 | 96 | 94 | 93 | 92 | 91 | 15.5 |
| C17 | 96 | 94 | 93 | 92 | 91 | 15.5 |
| C18 | 93.8 | 92.7 | 90.9 | 89.8 | 88.7 | 16.8 |
| C19 | 95.1 | 93.2 | 91.6 | 91.3 | 89.8 | 15.5 |
| DC1 | 91.6 | 90.8 | 89.3 | 88.5 | 86.5 | 17.6 |

It can be seen from the data in Table 4 that compared with DC1, the time required by C1-C19 to charge to the same SOC is shorter. The performance can be improved by at least 8% in terms of the time required to charge to 80% SOC. The reactive emulsifying agent is superior to the conventional emulsifying agent in the dynamics, whereby the charging rate is increased. As shown through comparison of C4-C6, with the increase of the molecular weight of the polymer, the charging rate to attain 80% SOC is elevated by 25%, because a longer molecule chain is more beneficial to the conduction of lithium ions. The discharging rate has no obvious change with several varying reactive emulsifying agents. Compared with C1, the charging rate of C18 and C19 is lower because the ion conductivity of styrene-butadiene rubber and polyvinylidene fluoride is inferior to that of an acrylate binder.

It can be seen from the data in Table 5 that C1-C19 are better than DC1 in terms of the cycle performance and the increase rate in thickness of the electrode plate. After 500 rounds of cycle, the capacity retention rates of C1-C19 are all above 88.7%, which is higher than that (86.5%) of the control group by 2.2%. After 500 rounds of cycle, the increase rate in thickness of the electrode plate of C1-C19 are all below 16.8%, which is lower than that (17.6%) of the control group by 0.8%. As shown through comparison of C9-C12, with the increase of the glass transition temperature, the increase rate in thickness of the anode plate trends to rise gradually. This is because after separation, the particles cannot be pulled back by the binder due to the weakening of the rebound resilience, the lowering of the tenacity, and the increasing of the plasticity of the binder with the increase of the glass transition temperature, thereby causing the thickness of the electrode plate to increase.

In summary, the descriptions above are merely a few examples of this application, which are not intended to limit this application in any way. Although this application is disclosed as above in connection with preferred examples, this application is not limited thereto. Some variations and modifications made by any person of skill in the art based on the technical contents disclosed above without departing from the scope of the technical solution of this application provide equivalent embodiments of this application, which also fall within the scope of the technical solution.

The invention claimed is:

1. A binder for a lithium ion battery, comprising a polymer, wherein the polymer is obtained through emulsion polymerization of a monomer in the presence of a reactive emulsifying agent;

the monomer comprises at least one compound having a chemical structure of Formula I:

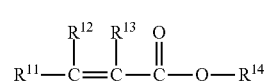

Formula I wherein $R^{11}$ is hydrogen or $R^{11}$ is selected from an alkyl group having 1 to 20 carbon atoms; $R^{12}$ is hydrogen or $R^{12}$ is selected from an alkyl group having 1 to 20 carbon atoms; $R^{13}$ is hydrogen or $R^{13}$ is selected from an alkyl group having 1 to 20 carbon atoms; and $R^{14}$ is hydrogen or $R^{14}$ is selected from an alkyl group having 1 to 20 carbon atoms;

the reactive emulsifying agent is selected from a compound with a chemical structure comprising a moiety of Formula IV:

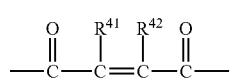

Formula IV wherein $R^{41}$ is hydrogen or $R^{41}$ is selected from an alkyl group having 1 to 20 carbon atoms; and $R^{42}$ is hydrogen or $R^{42}$ is selected from an alkyl group having 1 to 20 carbon atoms.

2. The binder for a lithium ion battery according to claim 1, wherein $R^{41}$ and $R^{42}$ are all hydrogen.

3. The binder for a lithium ion battery according to claim 1, wherein the reactive emulsifying agent is selected from at least one of a maleate and a derivative thereof, wherein the maleate and the derivative thereof are selected from at least one of a compound with a chemical structure of Formula IX:

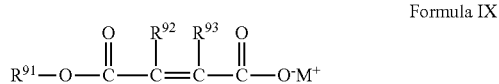

Formula IX where $R^{91}$ is hydrogen or $R^{91}$ is selected from an alkyl group having 1 to 20 carbon atoms; $R^{92}$ is hydrogen or $R^{92}$ is selected from an alkyl group having 1 to 10 carbon atoms; $R^{93}$ is hydrogen or $R^{93}$ is selected from an alkyl group having 1 to 10 carbon atoms; and $M^+$ is selected from at least one of $Li^+$, $Na^+$, $K^+$, $Rb^+$, $Cs^+$, and $NH_4^+$.

4. The binder for a lithium ion battery according to claim 1, wherein the weight ratio of the reactive emulsifying agent to the monomer is 1-3:100.

5. The binder for a lithium ion battery according to claim 1, wherein the polymer has a glass transition temperature from 0° C. to 50° C.

6. The binder for a lithium ion battery according to claim 1, wherein the polymer has a weight average molecular weight from 300 kDa to 1,500 kDa.

7. The binder for a lithium ion battery according to claim 1, wherein the binder has a solid content from 25 wt % to 50 wt %.

8. An electrode plate, comprising at least one of the binders according to claim 1.

9. A lithium ion battery, comprising at least one of the binders according to claim 1.

* * * * *